United States Patent [19]
Welch et al.

[11] Patent Number: 5,419,529
[45] Date of Patent: May 30, 1995

[54] REUSABLE MOLD FOR FORMING PREMOLDED PIECES AND A MODULAR CONTAINED MACHINE FOUNDATION

[75] Inventors: William L. Welch, Houston; Don W. Sluder; Richard L. Cory, both of Lake Jackson, all of Tex.

[73] Assignee: APT, Inc., Cypress, Tex.

[21] Appl. No.: 113,388

[22] Filed: Aug. 30, 1993

Related U.S. Application Data

[63] Continuation-in-part of Ser. No. 816,150, Dec. 31, 1991, Pat. No. 5,240,223, and a continuation-in-part of Ser. No. 962,968, Oct. 16, 1992, which is a continuation-in-part of Ser. No. 625,293, Dec. 10, 1990, Pat. No. 5,165,651, which is a continuation-in-part of Ser. No. 449,608, Dec. 11, 1989, abandoned.

[51] Int. Cl.⁶ .................................... B29C 39/26
[52] U.S. Cl. .................................. 249/134; 249/149; 249/163; 249/168
[58] Field of Search ............... 249/144, 146, 149, 160, 249/163, 166, 193, 194, 63, 66.1, 134, 102, 168, 189

[56] References Cited

U.S. PATENT DOCUMENTS

| | | | |
|---|---|---|---|
| 813,439 | 2/1906 | Landon | 249/144 |
| 829,586 | 8/1906 | Hubbard | 249/149 |
| 853,837 | 5/1907 | Steber | 249/146 |
| 939,059 | 11/1909 | Morris | 249/149 |
| 943,860 | 12/1909 | Brown | 249/149 |
| 959,438 | 5/1910 | Blose | 249/144 |
| 1,014,360 | 1/1912 | Allen | 249/144 |
| 1,129,658 | 2/1915 | Foy | 249/193 |
| 2,854,724 | 10/1958 | Wuorio | 249/168 |
| 2,940,152 | 6/1960 | Riehl | 249/194 |
| 3,136,024 | 6/1964 | Monica | 249/144 |
| 3,374,983 | 3/1968 | Garretson et al. | 425/437 |
| 3,570,801 | 3/1971 | Moritz et al. | 249/166 |
| 3,952,990 | 4/1976 | Garcia | 249/63 |
| 4,351,507 | 9/1982 | Toffolson et al. | 249/63 |
| 4,842,251 | 6/1989 | Fitzgerald et al. | 249/134 |
| 5,165,651 | 11/1992 | Welch et al. | 248/678 |

Primary Examiner—Jay H. Woo
Assistant Examiner—Robert B. Davis
Attorney, Agent, or Firm—Kurt S. Myers

[57] ABSTRACT

The present invention is directed to reusable molds which are used to mold various pieces including a modular contained machine foundation unit. Most pieces are molded as a hollow form which surrounds vertically extending reinforcement rods and is filled with a fortifying material to secure the hollow form to a slab. The hollow form is preferably made of an aggregate filled thermosetting resin which is a corrosion and chemical resistant material. More particularly, the present invention is directed to unique products which may be easily secured to a slab or foundation

8 Claims, 9 Drawing Sheets

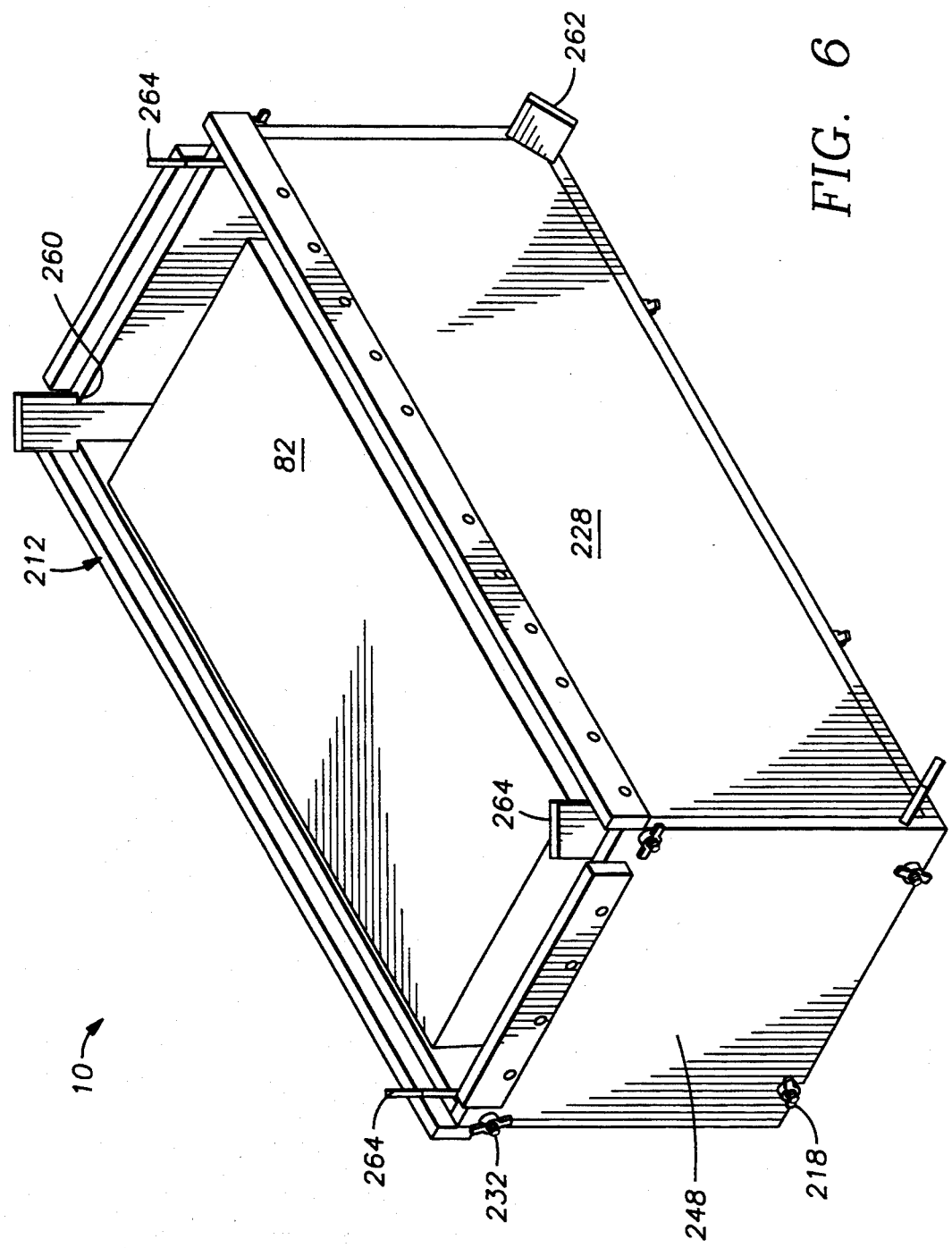

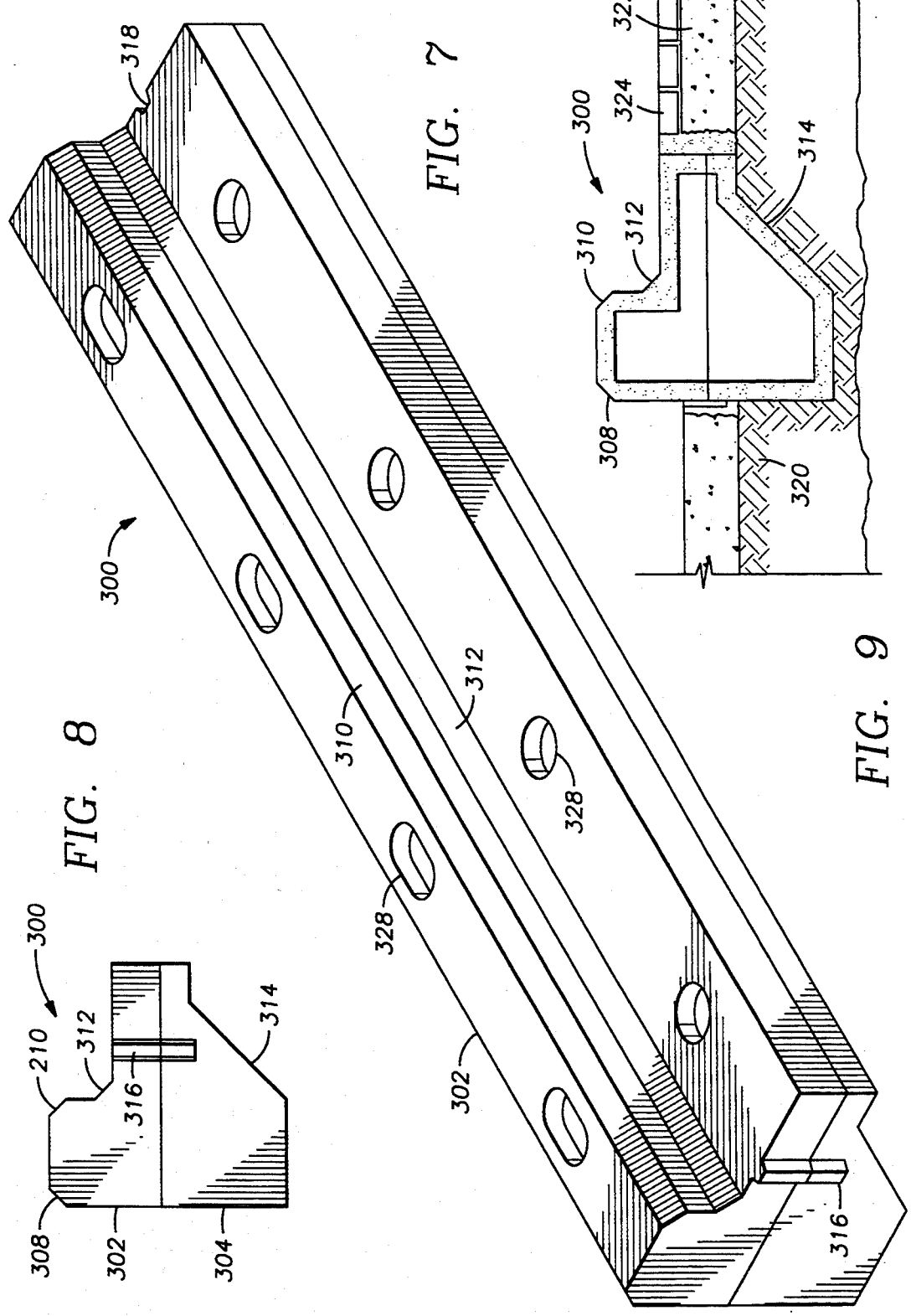

REUSABLE MOLD FOR FORMING PREMOLDED PIECES AND A MODULAR CONTAINED MACHINE FOUNDATION

RELATED APPLICATIONS

This application is a continuation-in-part of U.S. patent application Ser. No. 07/816,150, now U.S. Pat. No. 5,240,223, filed Dec. 31, 1991, entitled "REUSABLE MOLD FOR FORMING A HOLLOW AGGREGATE FILLED THERMOSET ARTICLE".

This application is also a continuation-in-part application of U.S. patent application Ser. No. 07/962,968, filed Oct. 16, 1992, entitled "METHOD FOR PREPARING OR REPAIRING A MACHINE FOUNDATION", which is a continuation-in-part application of U.S. patent application Ser. No. 07/625,293 filed Dec. 10, 1990 entitled "MACHINE FOUNDATION AND METHOD FOR PREPARING OR REPAIRING A MACHINE FOUNDATION", now U.S. Pat. No. 5,165,651, which is a continuation-in-part application of U.S. patent application Ser. No. 07/449,608 filed Dec. 11, 1989 entitled "MACHINE FOUNDATION AND METHOD FOR PREPARING OR REPAIRING A MACHINE FOUNDATION", now abandoned.

FIELD OF THE INVENTION

The present invention is directed to a reusable mold for forming premolded pieces and a modular contained machine foundation unit which includes a containment base. More specifically, the present invention is directed to a mold which is easily used to form precast pieces, preferably made of an aggregate filled thermosetting resin which is corrosion and chemical resistant. The precast pieces include curbing for containment, ramps, liners and a modular contained machine foundation unit.

BACKGROUND OF THE INVENTION

Bases for equipment such as pumps have been preformed and designed for specific purposes such as to collect leaking liquids as illustrated by U.S. Pat. No. 2,916,233. Molds have been used to cast a reusable foundation for a pump jack as disclosed in U.S. Pat. No. 2,998,216.

Machine bases have used corrosion resistant materials such as disclosed in U.S. Pat. No. 4,632,346 and U.S. Pat. No. 4,731,915. In each of these patents epoxy materials are disclosed.

U.S. Pat. Nos. 4,670,208 and 4,826,127 disclose a method of manufacturing machine supports from acrylic concrete. These patents disclose various machine supports made from mixtures of aggregates and methacrylate monomer being poured into a prepared mold.

None of the prior art patents disclose a modular containment unit made of an aggregate filled thermosetting resin or a thermoplastic resin which may be filled with a fortifying material to make a pump or other equipment foundation.

SUMMARY OF THE INVENTION

The present invention is directed to reusable molds which are used to mold various pieces including a modular contained machine foundation unit. Most pieces are molded as a hollow form which surrounds vertically extending reinforcement rods and is filled with a fortifying material to secure the hollow form to a slab. The hollow form is preferably made of an aggregate filled thermosetting resin which is a corrosion and chemical resistant material. More particularly, the present invention is directed to unique products which may be easily secured to a slab or foundation.

BRIEF DESCRIPTION OF THE DRAWINGS

FIG. 1A is a perspective view of the truncated conical piece which forms an opening in the upper horizontal wall of the form made in one embodiment of the reusable mold;

FIG. 6 is a perspective view of the assembled second embodiment of this reusable mold of the present invention;

FIG. 7 is a perspective view of a curbing product formed in the reusable forms of the present invention;

FIG. 8 is an end view of the curbing product;

FIG. 9 is an end cross-sectional view of the curbing before being filled with a filler material;

BRIEF DESCRIPTION OF THE PREFERRED EMBODIMENTS

Figure 1:
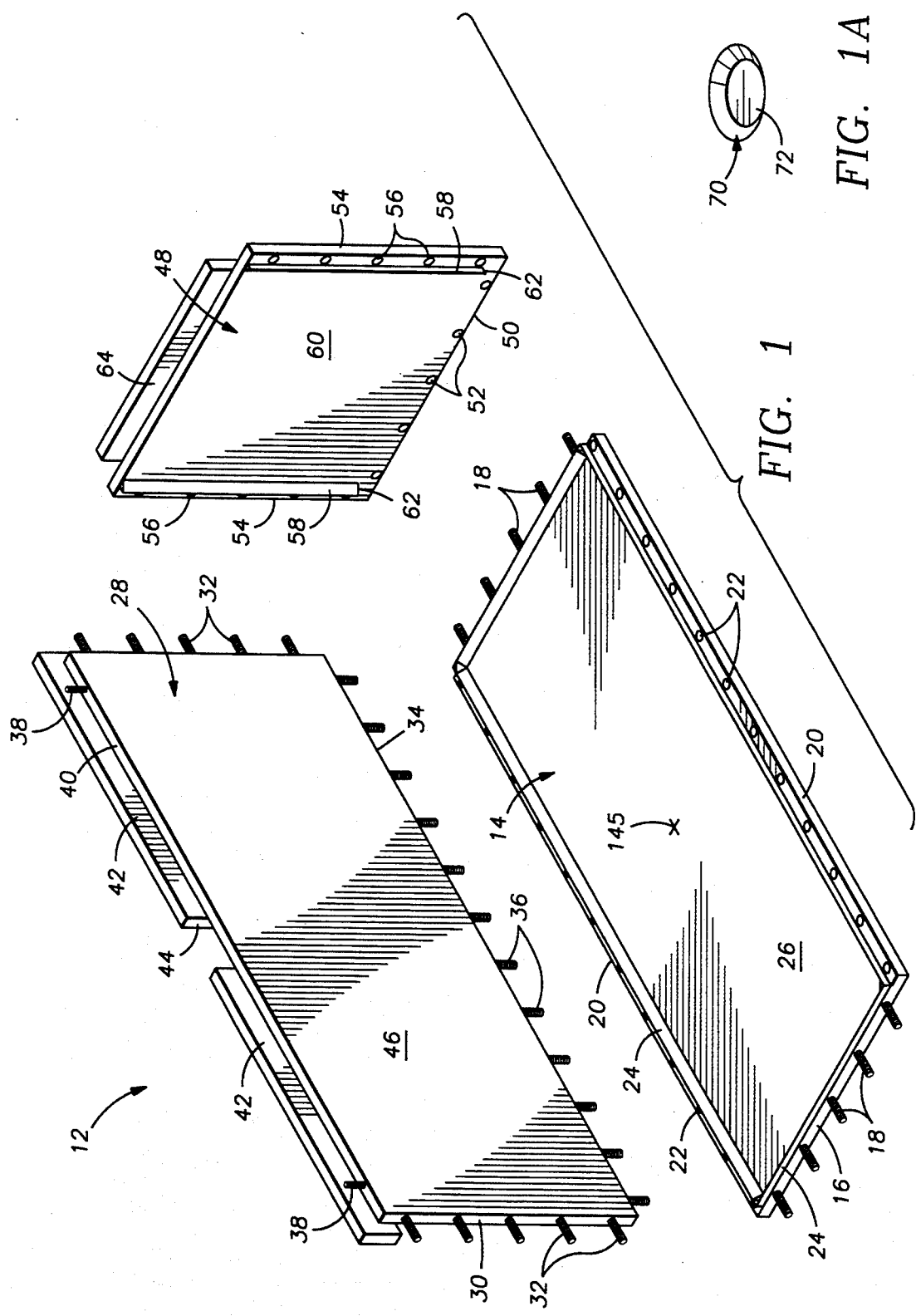
FIG. 1 is an exploded view of the elements which comprise the outer female mold of one embodiment of a reusable mold.

An embodiment of a reusable mold 10 of the present invention was described in U.S. patent application Ser. No. 07/816,150, specifically, a reusable mold to form the hollow form, made of an aggregate filled thermosetting resin, of a machine base. The mold 10 was disclosed as follows:

Referring to FIG. 1, the elements of the outer female mold 12 are illustrated, each of which are made of thermoplastic sheets. The preferred thermoplastic is high density polyethylene. A specific material of construction is 1" polyethylene sheets. Unless otherwise stated the specific material used to construct the mold 10 of the present invention will be illustrated by 1" polyethylene sheets. The outer mold 12 has a rectangular base 14. At the ends 16 of the base 14 are a number, such as five, spaced metal bolts 18 extending along the center line. Spaced from the sides 20 of the base 14 are a series of holes or openings 22 adaptable to receive a bolt as will be described in more detail hereinafter. Strips 24 of polyethylene, shaped as ⅜" right triangular molding with one side down on and another vertically extending from the top face 26 of the base 14, are screwed to the face 26. The screws are countersunk and the heads are covered with a hot glue or wax (not shown). A suitable material is the glue used in a craft hot gun. The glue or wax is sanded to a smooth surface after cooling. The outer mold 12 has two rectangular sides 28. At the ends 30 of the side 28 are a number, such as five, spaced metal bolts 32 extending along the center line. Along the centerline of the bottom 34 of the sides 28 are a series of metal bolts 36. The number of bolts 36 are the same number as the openings 22 and have the same spacing such that the bolts 36 may pass easily through the openings 22 for bolting the sides 28 to the base 14. Two metal bolts 38, one near each end 30 of the side 28, extend from the top 40 of the sides 28. Further two strips 42 are screwed to the outer surface or the opposite surface from the inner surface or face 46 of the side 28 so as to extend above the top 40 and are spaced to leave a slot 44. The purpose of the bolts 38 and the strips 42 will be described in more detail hereinafter. The outer mold 12 has two ends 48. Spaced from the bottom 50 of ends 48 are a series of holes or openings 52 adaptable to receive bolts 18 extending from the ends 16 of base 14. Likewise, spaced from the side edges 54 are a series of holes or openings 56 spaced and of the same number to receive bolts 32 extending from the ends 30 of the sides 28. Strips of polyethylene 58, the same as strips 24, are screwed to the face 60 of the ends 48 parallel to the side edges 54. When the ends 48 are bolted to the base 14, the bottom 62 of the strips 58 sit on the strips 24 and further, the face 46 of sides 28 abut the vertically extending flat side of strips 58. A strip 64 is screwed to the outer surface or the side opposite of the face 60 of ends 48, the purpose of which will be described in more detail hereinafter.

It is clear that when the sides 28 and the ends 48 are bolted to the base 14 that the outer dimensions of the cast form are defined by the inner dimensions of the outer form 12. The form will have a top wall with a width being the dimension between the faces 46 of the sides 28 and a length being the dimension between the faces 60 of the ends 48. The strips 24 and 58 provide a chamfered edge to the form rather than sharp edges which are subject to being broken. According to the preferred embodiment, the cast form has an opening in the top wall. To form the opening, referring to FIG. 1A, a truncated cone piece 70 with tapered sides, preferably 45°, is placed in the center of face 26 of base 14. The piece 70 is placed with the larger diameter facing upward and the smaller diameter surface 72 on the face 26 of base 14. The smaller diameter surface 72 may be between 4" and 10".

Figure 2:
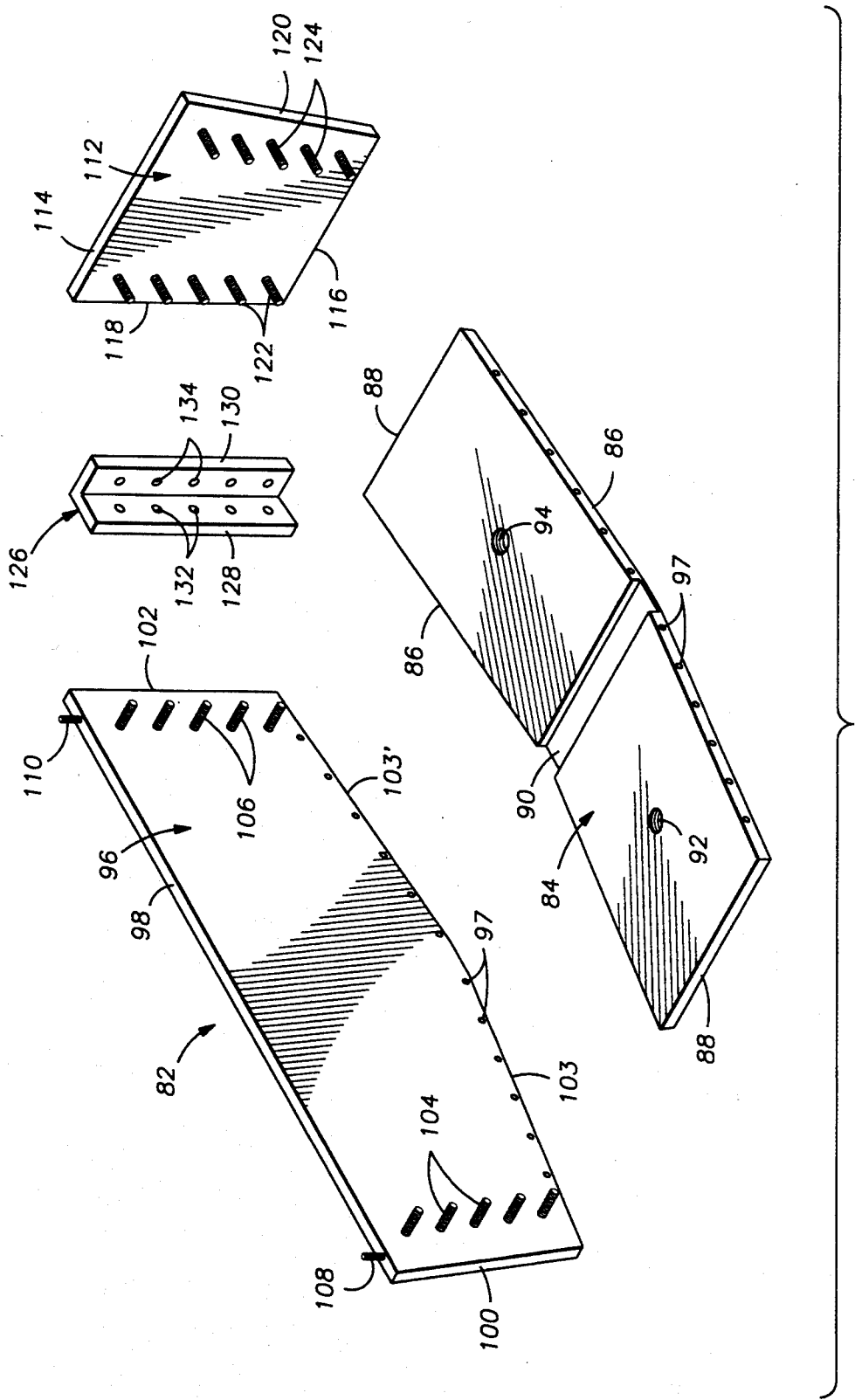
FIG. 2 is an exploded view of the elements which comprises the inner male mold of this embodiment of the reusable mold.

Referring to FIG. 2, the elements of the inner male mold 82 are illustrated, each of which are made of sheets of thermoplastic resins. The inner mold 82 has a base 84, preferably made from a sheet of polyethylene. The base 84 has two sides 86 and two ends 88. A notch 90 extends between the sides 86 midway between the ends 88. The notch 90 permits the base 84 to be bent into a v-shape and provides a slight taper to the base 84 from the center to the ends 88. Two holes 92 and 94 are drilled and threaded in the center of each of the two halves of the base 84, the purpose of which will be explained in more detail hereinafter. The inner mold 82 has two pentagonal sides 96. The sides 96 are screwed (see screw holes 97) to the base 84. The sides 96 have a top edge 98 and two tapered edges 100 and 102, e.g. the bottom point of the side is $\frac{3}{4}$" to $1\frac{1}{4}$" less than square at the bottom. There are preferably two edges 103 and 103' at the bottom of the sides 96 to provide a slight taper and defining the v-shape of base 84 or having the same v-shape as base 84. In some instances, there is no need or desire to have the base tapered end-to-end and then the bottom of side 96 has only one edge 103. Parallel to the tapered edges 100 and 102 are a series of bolts 104 and 106; also, spaced from each of these edges and on the top edge 98 is a bolt 108 and 110, the function of which will be explained in more detail hereinafter. The edges 86 of base 84 are tapered. The screw holes in sides 96 are countersunk so the heads are below the outer surface and the countersink is filled with hot glue or wax. The inner mold 82 has two trapezoidal ends 112. The longer edge is the top edge 114 and the shorter edge is the bottom edge 116. The tapered edges or sides 118 and 120 of ends 112 are tapered, e.g. the shorter edge is $\frac{3}{4}$" to $1\frac{1}{4}$" less than the longer edge. Parallel to the sides 118 and 120 are a series of bolts 122 and 124, the function of which will be explained in more detail hereinafter. The inner mold has four L-shaped braces 126 which secures the ends 112 and the sides 96 to complete the inner mold 82. Braces 126 are made of two strips 128 and 130 which are screwed together (not shown). Strip 128 has a series of holes or openings 132, the number and spacing being the same as the number and spacing of the bolts 106 of side 96, five for example, and spaced so that the bottom edge 116 of end 112 is flush with the upper surface of base 84. Strip 130 has a series of holes or openings 134, the number and spacing being the same as the number and spacing of the bolts 122 of end 112, five for example, and spaced so that the bottom edge 116 of end 112 is flush with the upper surface of base 84 but further that the outer surface of end 112 is flush with the edge 88 of base 84. The bottom edge 116 is tapered at the same angle as the angle of the v of the base 84. In this regard, the edges 86 of the base 84 will be tapered at the same angle as the taper of the edges 118 and 120 of the ends 112, respectively. Likewise, the edges 88 of the base 84 are tapered but at the same angle as the taper of the edges 100 and 102 of sides 96, respectively.

Figure 3:
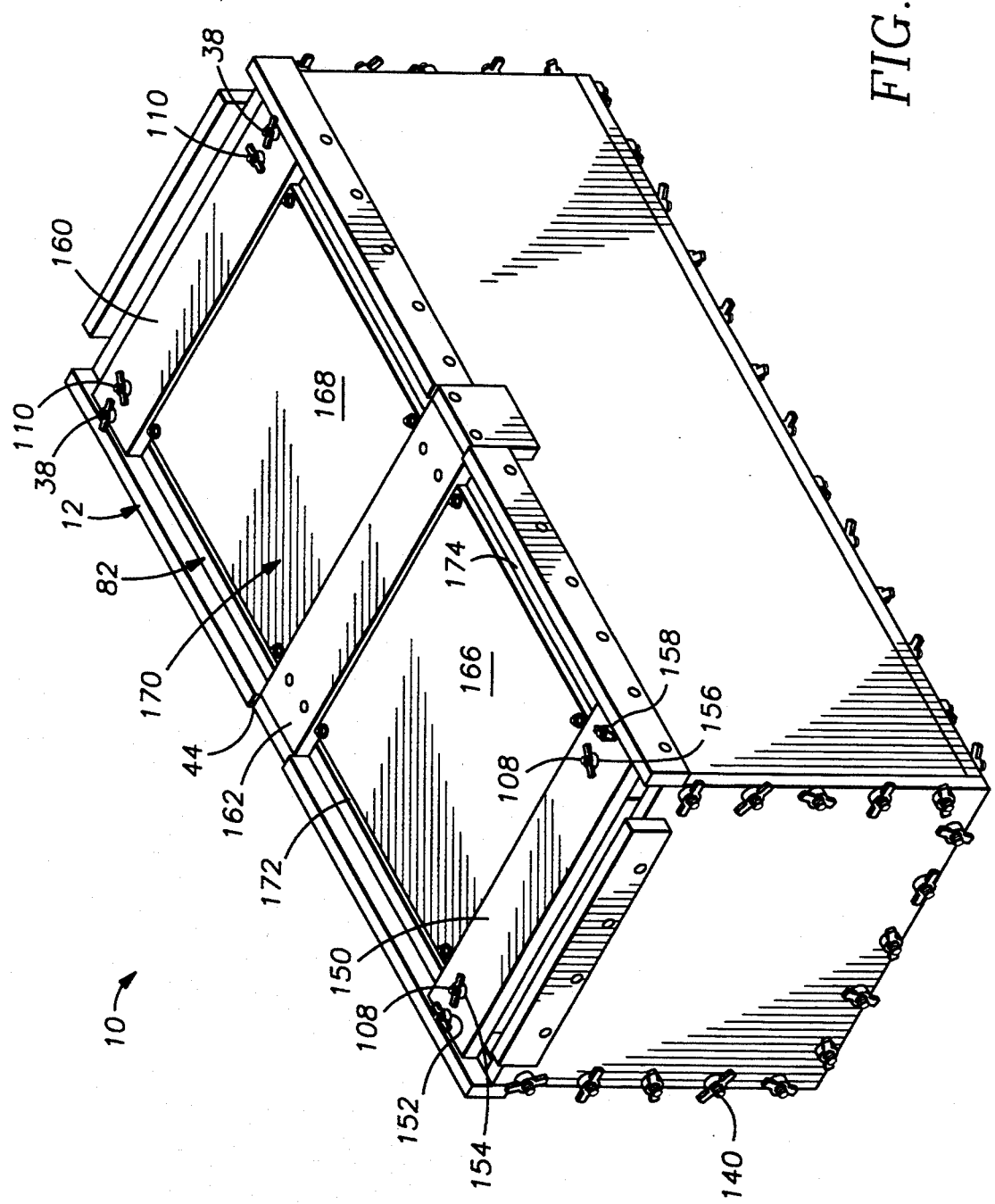
FIG. 3 is a perspective view of the assembled embodiment of this reusable mold of the present invention.

The outer female mold 12 and the inner male mold 82 which are the major structure of the reusable mold 10 have been described with reference to FIG. 1 and FIG. 2. The assembled mold 10 is shown in FIG. 3. The order of assembly of the outer mold 12 or the inner mold 82 has no particular significance; however, a description of assembly of each mold is given to summarize the respective molds. To assemble the outer mold 12, the sides 28 are bolted to the base 14 by passing the bolts 36 at the bottom of sides 28 through the openings 22 in the base 14. Wing nuts are used to secure the sides 28 to the base 14. When the sides 28 are secured to the base 14, the face 46 of the sides 28 abut and are in the same plane as the extending flat side of the strips 24 which are parallel to the edges 20 of the base 14. Further, the length of the sides 28 are the same as the length of the edges 20 of the base 14 and thus, the edges 30 of the sides 28 are flush with the edges 16 of the base 14. The ends 48 are then secured to the base 14 and sides 28 of the outer mold 12 by passing the bolts 16 and 32 through the openings 52 and 56, respectively, and placing wing nuts 140 securely on each bolt.

To fabricate the form with a hole or opening in the middle of the upper wall, the truncated cone piece 70 is placed in the center 145 of face 26 of base 14.

To assemble the inner mold 82, the sides 96 are screwed to the base 84. Holes 97 are drilled into sides 96 and while not shown specifically in the drawings, are countersunk so as to align with the edges 86 of the base 84. The screws used are metal screws and after being securely inserted, the heads of each screw is covered with a hot glue or wax. The glue or wax is allowed to cool and set and then the surface is sanded to assure a smooth continuous surface. The L-shaped braces 126 are assembled by screwing strip 130 to strip 128. The screws are countersunk so that the heads do not interfere with the assembly but since these are not surfaces which will contact the reinforced thermosetting resin used to fabricate the desired form, the filling of the openings with glue or wax is not necessary. A brace 126 is secured to a side 96 by passing the bolts 106 through the openings 132 and are tightly secured by hex nuts. After two braces 126 are secured to one end of inner mold 82, the end 112 is secured in place by passing the bolts 118 and 124 through the openings 134 of the respective brace 126. The other end 112 is secured in the same manner. Before the inner mold 82 is placed into the outer mold 12, the openings 92 and 94 are plugged with a material which will not stick to the aggregate filled thermosetting resin. Suitable material is pressboard or a polyurethane plug, especially a plug of closed cell polyurethane known as backed rod used in thermal expansion joints.

Referring now to FIG. 3, a strip 150 having a length the same as the outer dimension or width of the outer mold 12 has four openings 152, 154, 156 and 158. Openings 154 and 156 are spaced such that bolts 108 which are on the upper edge 98 of side 96 will pass through and strip 150 is secured to the inner mold 82 by wing nuts (not numbered). Likewise, a strip 160 is secured to the inner mold 82 by passing the bolts 110 through openings in strip 160 and securing by wing nuts. The two strips 150 and 160 provide easy means to lift the inner male mold 82 and place into the female outer mold 12. The base 84 of the inner mold 82 will sit on the cone piece 70; however, the openings 152 and 158 in strip 150 and the corresponding openings in strip 160 are aligned with bolts 38 on the upper edge of sides 28 to allow the bolts to pass through. The strips 150 and 160 are secured with wing nuts. When secured, the strips 150 and 160 align the inner mold 82 within the outer mold 12 such that there is a space between the respective bases 14 and 84, the respective sides 28 and 96 and the respective ends 48 and 112. The dimension of the space is the thickness of the form being fabricated. This space thickness or dimension between the bases, sides and ends may vary from $\frac{1}{4}$" to over 2".

As is shown in FIG. 3, the hollow opening at the top of the inner mold 82 is closed by the strips 150 and 160, a U-shaped center strip 162 and two rectangular cover pieces 166 and 168. The width of the strip 162 is the same as the gap 44 between strips 42 on the upper edge 40 of sides 28. The three strips 150, 160 and 162 together with the two rectangular cover pieces 166 and 168 provides a surface 170 for pouring the mixed slurry of aggregate filled thermosetting resin.

A pourable slurry of an aggregate filled thermosetting resin is prepared. The Part A resin is mixed in desired proportions with the Part B hardener and sand and aggregate are mixed. The slurry is poured out on the surface 170 and the slurry is troweled into the space 172. By filling the space from one side, the air in the space between the outer and inner mold is pushed out as the slurry flows down the space on the one side 172 and under the base 84 of the inner mold 82 and up the space 174 on the other side. The function of the strips 42 on the sides 28 are clear in that the slurry as it is introduced into the gap does not go over the top edge 40 and fall on the floor. When the spaces 172 as well as 174 and the space between the respective ends are filled, slurry is introduced all around to make certain that the full height of the form being fabricated is achieved.

The forms when assembled may be placed on a dolly before being filled with the aggregate filled thermosetting resin. The filled reusable form 10 may be rolled to a place to cure or placed in a oven to accelerate the curing. The oven need be heated only to 150° F. for the time of curing to be greatly reduced. The form 10 is allowed to cool which will give an indication that the curing process is complete.

Figure 4:
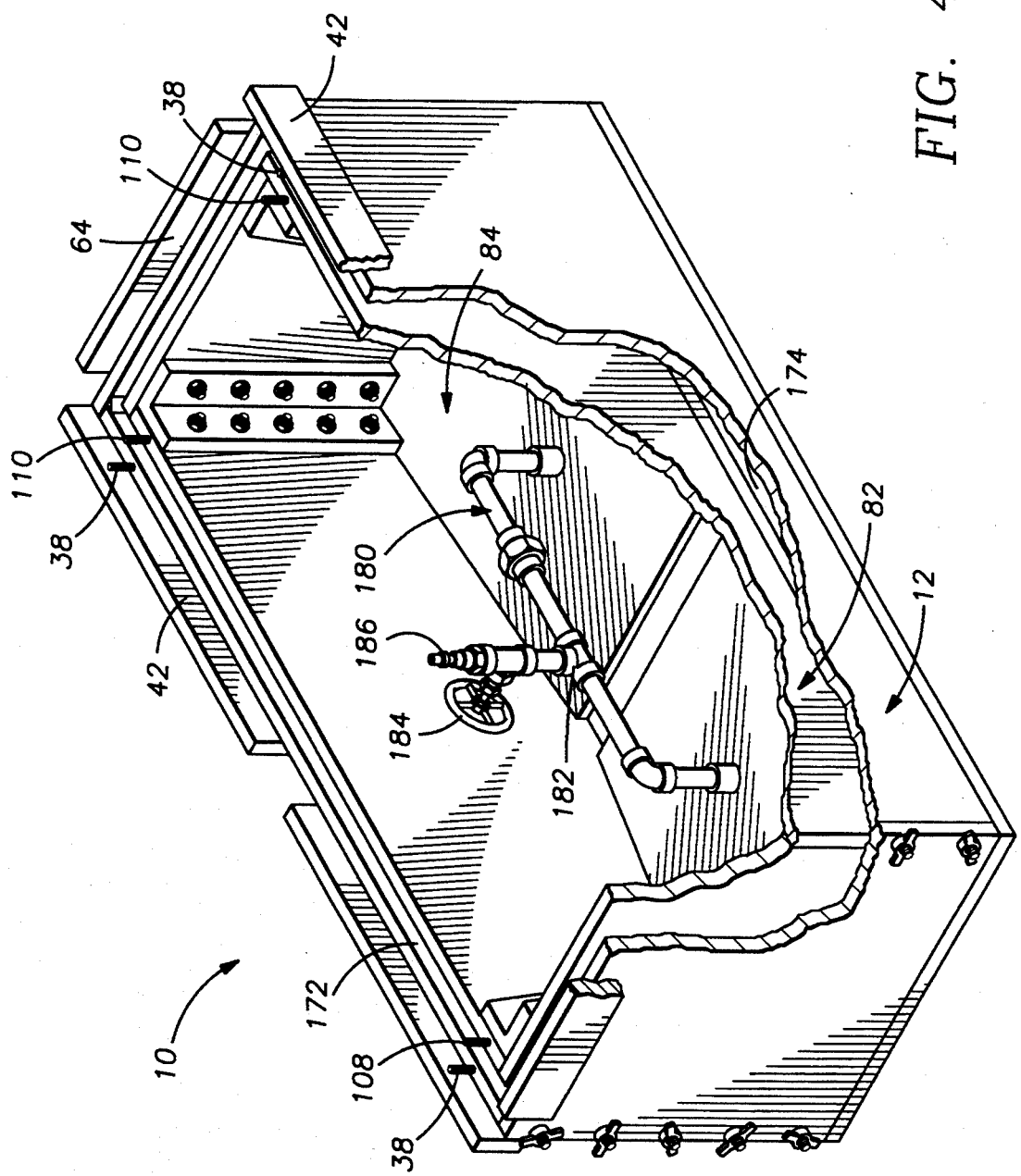
FIG. 4 is a perspective view of the first embodiment of the reusable mold of the present invention with a partial cutaway portion to show the air supply attached to pop or remove the inner mold from the form cast in the reusable mold.

After the aggregate filled thermosetting resin cures, the cast form is removed from the reusable mold 10 of the present invention. Referring to FIG. 4, the strip 162 and the two rectangular covers 166 and 168 are removed exposing the hollow inner mold 82. The plugs placed into openings 92 and 94 are removed. Into each opening 92 and 94 is inserted a piece which has a threaded end and at the other end has a connector for a pipe. An air supplier 180 is connected to each of the connectors in openings 92 and 94. The air supplier 180 may include a tee 182 having a valve 184 extending above the tee 182 and then a snap connector 186 which connects to a air compressor line (not shown). Pipes extend from the tee 182 and form a U-shaped piece which connects to the pieces in openings 92 and 94. The air supplier 180 is connected and the air compressor line (not shown) attached. The compressor is started to provide air under a pressure of 75 to 300 psi and valve 184 is opened. A rubber mallet may be used to pound on the inner faces of the inner mold 82. When the air is supplied through the openings 92 and 94, the inner mold 82 pops or is lifted from the cast form. The strips 150 and 160 may have already been removed or may be used to lift the inner mold 82 from the form. The outer mold 12 may be disassembled by removing the ends 48 and then the sides 28 by first removing the wing nuts.

This description is set forth to better understand a second embodiment of a reusable mold of the present invention.

Figure 5:
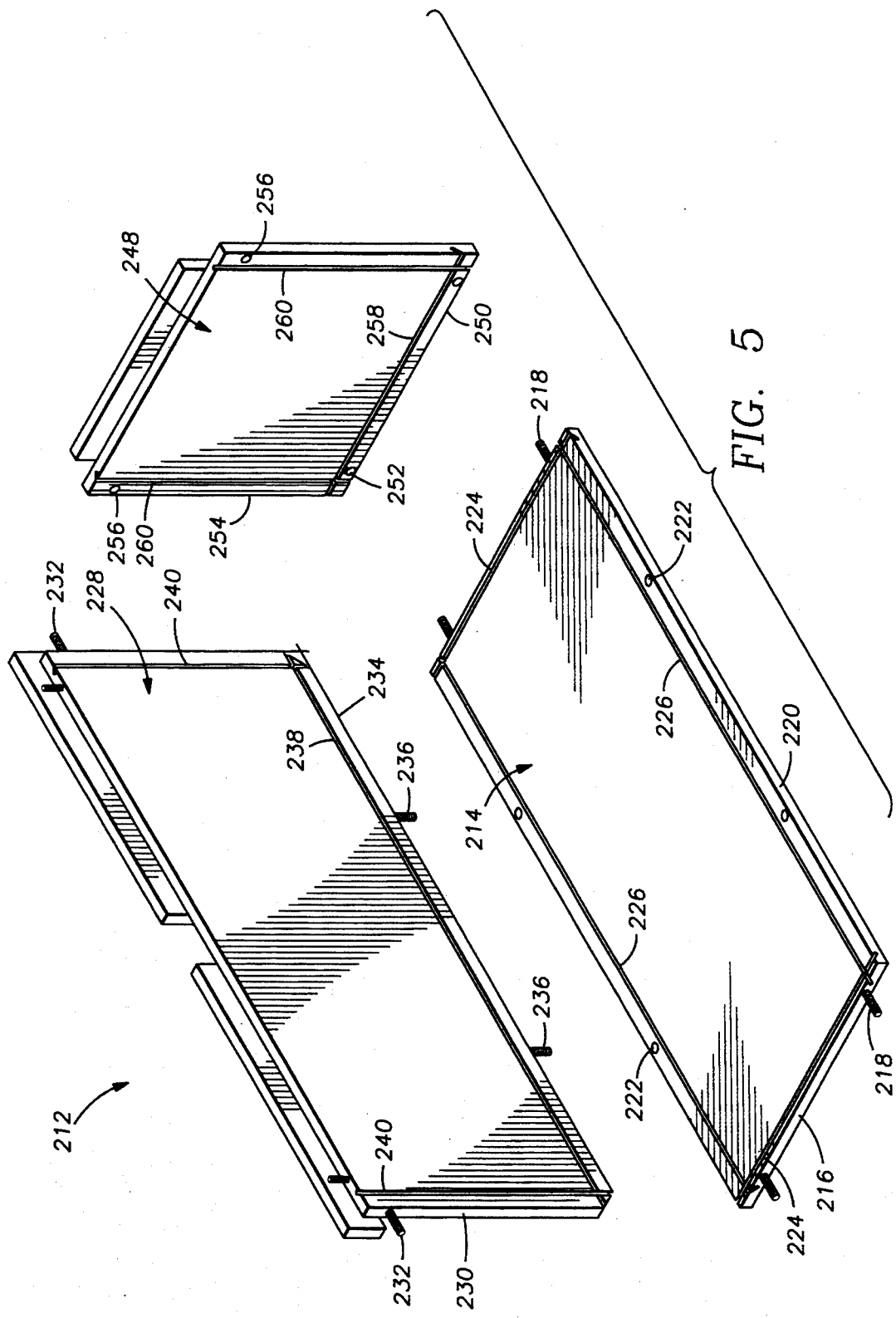
FIG. 5 is an exploded view of the elements which comprise the outer female mold of another or second embodiment of a reusable mold.

Referring now to FIG. 5, the elements of the outer female mold 212 are illustrated, each of which are made of thermoplastic sheets, preferably polyethylene. The outer mold 212 has a rectangular base 214. At the ends 216 of base 214 are two metal bolts 218. Spaced from the sides 220 are two holes or openings 222 adaptable to receive a bolt as will be described in more detail hereinafter. Along the ends 216 are a slot 224. Each slot 224 begins essentially at the end 216 and is directed inward at 45° to the surface of the base 214 toward the center of the base 214. Also spaced from each side 220 is a slot 226 which is at 45° to the surface and which begins essentially at the thickness of the sheets being used, e.g. about 1" from the side 220, and is directed inward toward the center of the base 214. These slots 224 and 226 will be described in more detail hereinafter.

The outer mold 212 has two rectangular sides 228. At the end 230 of each side 228 is a metal bolt 232. Along the bottom 234 of the sides 228 are two bolts 236. These bolts 236 are spaced to aline and pass through the openings 222 in the base 214 for bolting the sides 228 to the base 214. Along the bottom 234 of side 228 is a slot 238. Each slot 238 begins essentially at the bottom 234 and is directed at 45° to the surface of side 228 inward toward the center of the base 214. Also spaced from each end 230 is a slot 240 which begins essentially at end 230 and is directed at 45° to the surface of side 228 inwardly toward the center of side 228. In assembling the mold 212, the first operation is to bolt the sides 228 to the base 214. The slots 226 and 238 being in separate pieces of the mold 212 are described separately; however, the slots are made in the respective pieces so that after bolting the bolts 236 of side 228 to the base 214, the slots 226 and 238 are aligned to make a single slot 226–238. A strip of polyethylene 242 having a width which is essentially that of the single slot 226–238 and a thickness essentially of the slots is slid into the aligned slots 226 and 238 and secures the side 228 to the base 214. The strip of polyethylene 242 has a length which is the same as the bottom length dimension of side 228. The slots 226 and 238 are positioned such that a strip inserted into slots 226 and 238 has a small surface exposed between the side 228 and the base 214 and provides a chamfer edge to the product molded.

The outer mold 212 has two ends 248. Spaced from the bottom 250 of end 248 are two holes or openings 252 which receive the bolts 218 extending from the ends 216 of base 214. Likewise spaced from the side edges 254 are two holes or openings 258 spaced to receive bolts 232 extending from the ends 230 of the sides 228. Parallel to the bottom 250 of end 248 is a slot 258. Each slot 258 begins essentially at the thickness of the sheets being used, e.g. about 1" from the bottom 250, and is directed inward at 45° to the surface of end 248 toward the center of the end 248. Also spaced from each side 254 is a slot 260 which begins essentially at the thickness of the sheets being used, e.g. about 1" from the side edge 254 and is directed at 45° to the surface of end 248 inwardly toward the center of end 248. In assembling the mold 212, the next operation is to bolt the ends 248 to the base 214 and the sides 228. The slots 258 and 260 being in a separate pieces of the mold 212 are described separately; however, the slots are made in the respective pieces so that after bolting the bolts 218 of base 214 to the end 248 and the bolts 232 of side 228 to the end 248, the slots 258 and 260 are respectively aligned with slot 216 in base 214 and a slot 240 in the side 228 to make single slots 224–258 and 240–260. Two strips of polyethylene 262 (see FIG. 5) having a width which is essentially that of the single slot 224–258 and a thickness essentially of the slots is slid into the aligned slots 224 and 258 and secures the end 248 to the base 214 and sides 228. The strips of polyethylene 262 have a length which is longer than the bottom length dimension of end 248. The slots 224 and 258 are positioned such that strip 262 has a small surface exposed between the end 248 and the base 214 and provides a chamfer edge to the product molded. Four strips of polyethylene 264 (see FIG. 5) having a width which is essentially that of the single slot 240–260 and a thickness essentially of the slots is slid into the aligned slots 240 and 260 and secures the end 248 to the sides 228. The strips of polyethylene 264 have a length which is longer than the side length dimension of side 228. The slots 240 and 260 are positioned such that strip 264 has a small surface exposed between the side 228 and the end 248 and provides a chamfer edge to the product molded.

The reusable molds 10 are used to fabricate the forms described in U.S. Pat. No. 5,165,651 which is incorporated herein by reference. Therefore, the inner male mold 82 and the truncated piece 70 may be used with either outer female mold 12 or 212. However, the molds may be used to fabricate a significant number of other products which are preformed from the aggregate filled thermosetting materials set forth in U.S. Pat. No. 5,165,651 and other material which require a form to mold, such as concrete or plastic filled concrete. The advantages of thermosetting materials is that the products produced are chemically and corrosion resistant and therefore are suitable for applications that ordinary concrete will not hold up to over time. One such application is in spill containment where liquids are produced or stored. For example, the Environmental Protection Agency of the U.S. Government (EPA) requires that all areas surrounding a chemical storage tank be a coated contained area.

One product of the present invention for this application is the curbings 300 shown in FIGS. 7 to 10. The curbings 300 illustrate that the forms made in the reusable molds 10 need not be symmetrical. There are several approaches to the fabrication of products having non-symmetry: (1) assembling a specific mold especially designed for the product; (2) use polyethylene pieces within the outer female mold 212 to form the desired shapes with corresponding changes in the inner male mold; and (3) use modified pieces of side pieces of female mold 212 and a solid inner male mold. Another product is the ramp shown in FIG. 11. Still further a modular contained machine foundation unit, shown in FIG. 12, is a product which fully utilizes the reusable molds of the present invention.

Figure 10:
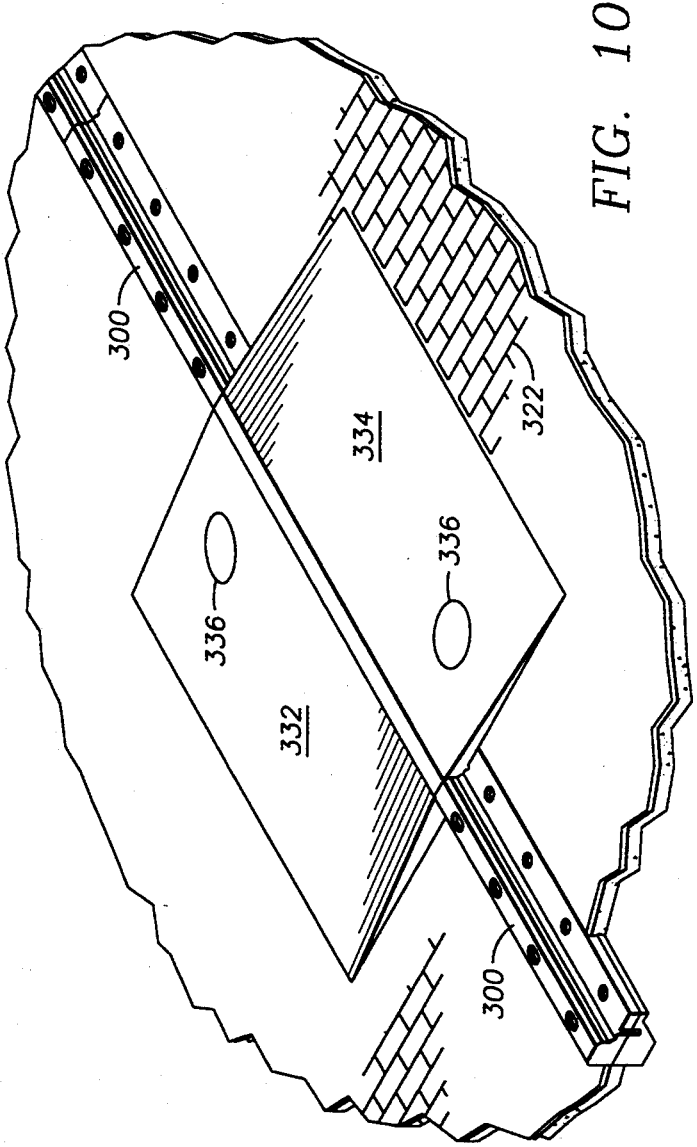
FIG. 10 is a perspective of a curbing and ramp.

Referring now to FIG. 7, the curbing 300 is formed having an upper piece 302 and a lower piece 304. The upper piece 302 may have chamfered surfaces 308, 310 and 312 or the surfaces need not be only vertical and horizontal, such as surface 314 of lower piece 304. The ends of the curbing pieces 302 and 304 have a tongue 316 at one end and a groove 318 at the other end to align and maintain the successive grooving pieces. The bottom or lower piece 304 is set in the earth or loose dirt 320 with the front surface at the level of a slab 322. As shown in FIG. 9, the curbing 300 acts as a retainer for a concrete slab 322 which has a layer of brick 324 laid over the slab. Between the slab 322 and the brick 324 is a layer of aggregate filled thermoplastic resin 326 to grout in the curbing 300. Inside the two pieces 302 and 304 may be a maze of reinforcing bars (not shown) to give added strength and the pieces filled with a filler material through the openings or holes 328 in the upper or top piece 302. As illustrated in FIG. 10, curbing 300 extends a distance where more than one upper and lower piece 302 and 304 forms the containment barrier between the side having a brick 322 surface and an outside surface. A ramp 330 is made of two pieces 332 and 334 each having an opening 336 which after the piece is in place is filled with a filler material, which may be concrete, a plastic filled concrete or the aggregate filled thermosetting resin materials used to fabricate the pieces.

Figure 11:
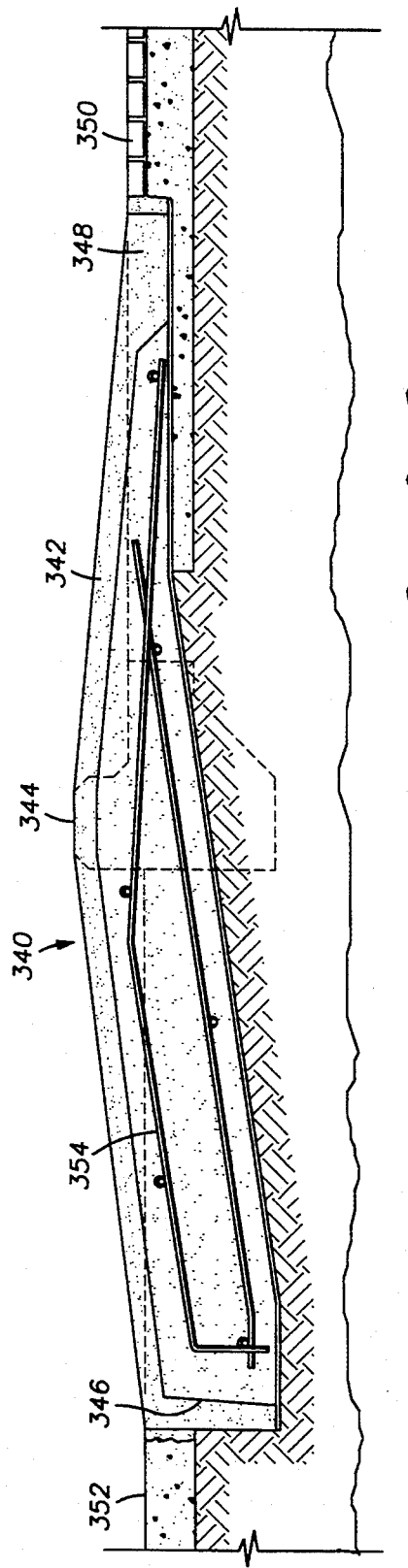
FIG. 11 is an end cross-sectional view of another embodiment of a ramp.

Referring now to FIG. 11 where another ramp product is shown. This ramp is fabricated in the mold 10 in the same manner as was described to fabricate the machine foundation except the base of the mold does not have a flat surface but is lower in the center than at either end (having a surface parallel to the male mold) and the male mold is not an equal distance from each of the end walls so that the thickness of the vertical walls of the form are not equal. The ramp 340 has a top surface 342 comes to a peak 344. One side wall 346 of the form or ramp 340 is a thinner wall than the other side wall 348. The wall 346 and 348 may be the same length when fabricated and cut in the field to extend from the bricked surface 350 to the other surface, shown as a concrete surface 352. The ramp 340 is placed over a maze of reinforcing rods 354 and when properly placed is filled through a hole or opening (not shown) in the top surface 342 of the ramp 340.

Figure 12:
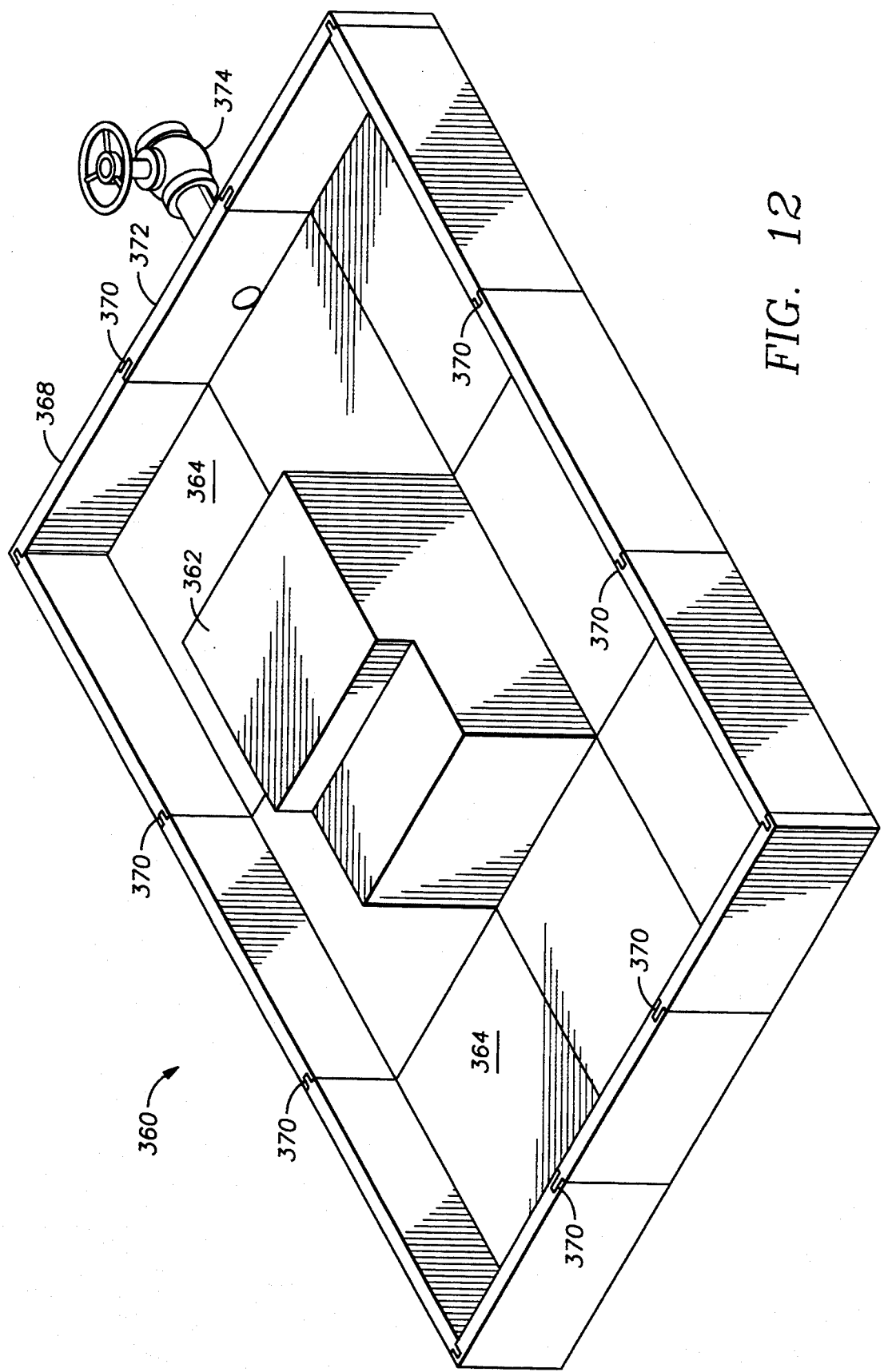
FIG. 12 is a perspective view of a modular contained machine foundation unit.

Referring to FIG. 12, a modular contained machine foundation unit 360 is shown. The unit 360 is made up of a plurality of modular pieces. In the center is a machine foundation 362. The containment area surrounding the machine foundation is assembled from a plurality of tongue and grove flat pieces 364 and 368, the tongue and groves shown at 370. In the side of one piece 372 is an opening with a valve 374. In the event of a spill, the liquid from the machine, such as a pump, is contained within the unit 360 but can be recovered through the discharge valve 374.

It is clear that many more individual products are possible by using the reusable molds of the present invention.

We claim:

1. A reusable mold for producing a cast form made of a reinforced thermosetting resin which comprises:
   an outer female mold comprising a base, two sides and two ends, each made of a thermoplastic sheet; said two sides and said base each having corresponding slots each at 45° to the surface of said sides and base to form a single slot; said two ends and said base each having corresponding slots each at 45° to the surface of said ends and base and sides to form a single slot; each of said ends and sides each having corresponding slots each at 45° to the surface of said ends and sides to form a single slot; and
   a thermoplastic strip in the slots between the sides and base, in the slots between the ends and base and in the slots between the sides and ends to secure respectively the sides to the base, the ends to the base and the ends to the sides.

2. A reusable mold according to claim 1 wherein in addition to said strips for securing the pieces of said outer mold, said sides have bolts and said base has an opening for bolting said sides to said base.

3. A reusable mold according to claim 2 wherein further said sides and said base have bolts and said end has openings for bolting said base and sides to said ends.

4. A reusable mold according to claim 1 wherein said thermoplastic sheet is polyethylene.

5. A reusable mold according to claim 1 wherein said thermoplastic is 1" polyethylene sheets.

6. A reusable mold according to claim 1 wherein said slots are aligned to expose a surface of said thermoplastic strips to produce a chamfer on the molded product being cast.

7. A reusable mold according to claim 1 which further includes an inner, male mold to produce a molded product being cast.

8. A reusable mold according to claim 7 which further includes means for securing said inner mold in said outer mold including two thermoplastic bars secured at the top of the ends of said inner mold and secured to the top of said outer mold.

* * * * *